US009499232B2

(12) United States Patent
Emura et al.

(10) Patent No.: US 9,499,232 B2
(45) Date of Patent: Nov. 22, 2016

(54) FRONT DERAILLEUR

(71) Applicant: Shimano Inc., Sakai, Osaka (JP)

(72) Inventors: Atsuhiro Emura, Osaka (JP); Kenkichi Inoue, Osaka (JP); Tomomi Sugimoto, Osaka (JP)

(73) Assignee: Shimano Inc., Osaka (JP)

( * ) Notice: Subject to any disclaimer, the term of this patent is extended or adjusted under 35 U.S.C. 154(b) by 112 days.

(21) Appl. No.: 14/282,080

(22) Filed: May 20, 2014

(65) Prior Publication Data

US 2015/0018145 A1 Jan. 15, 2015

(30) Foreign Application Priority Data

Jul. 11, 2013 (JP) .................................. 2013-145425

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/1342 | (2010.01) |
| B62M 9/135 | (2010.01) |

(52) U.S. Cl.
CPC ........... *B62M 9/1342* (2013.01); *B62M 9/135* (2013.01)

(58) Field of Classification Search
CPC  B62M 9/1342; B62M 9/1348; B62M 9/135; B62M 9/136; B62M 9/1344
USPC ...................................... 474/80, 82
See application file for complete search history.

(56) References Cited

U.S. PATENT DOCUMENTS

| | | | | |
|---|---|---|---|---|
| 4,199,998 A * | 4/1980 | Isobe | ................... | B62M 9/1342 280/236 |
| 4,279,605 A * | 7/1981 | Egami | .................... | B62M 9/135 474/82 |
| 4,330,137 A * | 5/1982 | Nagano | .................. | B62M 9/136 280/238 |
| 4,424,048 A * | 1/1984 | Shimano | ................ | B62M 9/137 474/82 |
| 4,486,182 A * | 12/1984 | Coue | ..................... | B62M 9/1342 474/78 |
| 4,543,078 A * | 9/1985 | Coue | .................... | B62M 9/1342 474/82 |
| 4,551,121 A * | 11/1985 | Nagano | .................. | B62M 9/136 474/140 |
| 4,586,913 A * | 5/1986 | Nagano | .................. | B62M 9/136 474/80 |
| 4,604,078 A * | 8/1986 | Nagano | .................. | B62M 9/136 474/80 |
| 5,104,358 A * | 4/1992 | Kobayashi | ........... | B62M 9/1342 474/82 |
| 7,014,584 B2 * | 3/2006 | Nanko | ................. | B62M 9/1342 474/80 |

(Continued)

FOREIGN PATENT DOCUMENTS

| | | |
|---|---|---|
| DE | 37 21 617 A1 | 1/1988 |
| DE | 10 2014 106 893 A1 | 11/2014 |

(Continued)

*Primary Examiner* — Henry Liu
(74) *Attorney, Agent, or Firm* — Global IP Counselors

(57) ABSTRACT

A front derailleur is provided for mounting to a bicycle having a crank axis. The front derailleur is provided with a base member, a chain guide and a link mechanism. The base member is mounted on the bicycle for positioning in a predetermined adjustment direction. The chain guide guides the chain. The link mechanism movably couples the chain guide to the base member. The link mechanism includes a first link member pivotally arranged in relation to the base member about a first link axis and pivotally arranged in relation to the chain guide about a second link axis. The first link axis and the second link axis are arranged non-parallel and non-orthogonal to the predetermined adjustment direction when viewed from the axial direction of the crank axis in a state where the base member is mounted to the bicycle.

18 Claims, 5 Drawing Sheets

(56) References Cited

U.S. PATENT DOCUMENTS

| | | | |
|---|---|---|---|
| 7,081,058 B2 * | 7/2006 | Nankou | B62M 9/1348 474/80 |
| 7,186,194 B2 * | 3/2007 | Nankou | B62M 9/1348 474/80 |
| 7,651,424 B2 * | 1/2010 | Yamamoto | B62M 9/135 474/82 |
| 7,722,486 B2 * | 5/2010 | Nanko | B62M 9/136 474/103 |
| 9,156,524 B2 * | 10/2015 | Emura | B62M 9/1242 |
| 2003/0083161 A1 * | 5/2003 | Ozaki | B62M 9/1344 474/80 |
| 2004/0185975 A1 * | 9/2004 | Chen | B62M 9/1344 474/80 |
| 2005/0143206 A1 * | 6/2005 | Tetsuka | B62M 9/135 474/80 |
| 2005/0192139 A1 * | 9/2005 | Ichida | B62M 25/08 474/80 |
| 2013/0085024 A1 * | 4/2013 | Inoue | B62M 9/136 474/80 |
| 2014/0171242 A1 * | 6/2014 | Jordan | B62M 9/131 474/82 |
| 2014/0349793 A1 * | 11/2014 | Emura | B62M 9/137 474/80 |
| 2014/0349794 A1 * | 11/2014 | Emura | B62M 9/131 474/82 |

FOREIGN PATENT DOCUMENTS

| | | |
|---|---|---|
| JP | 57-57194 U | 4/1982 |
| JP | 2007-186176 A | 7/2007 |

* cited by examiner

FRONT DERAILLEUR

CROSS-REFERENCE TO RELATED APPLICATIONS

This application claims priority to Japanese Patent Application No. 2013-145425, filed on Jul. 11, 2013 in Japan. The entire disclosure of Japanese Patent Application No. 2013-145425 is hereby incorporated herein by reference.

BACKGROUND

Field of the Invention

This invention generally relates to a front derailleur. More specifically, the present invention relates to a front derailleur which is attachable to a bicycle with a crank axis.

Background Information

Generally, a front derailleur has a base member for mounting the front derailleur a frame of a bicycle, a chain guide for guiding a chain, and a link mechanism for movably coupling the chain guide to the base member (for example, see Japanese Laid-Open Utility Model Publication No. S57-57194 and Japanese Laid-Open Patent Publication No. 2007-186176). In this conventional front derailleur, the base member is mounted to a seat tube for positioning in an adjustment direction that is along the axial direction of the seat tube.

The link mechanism typically has two link members that are arranged in parallel. The link members have first ends coupled to the chain guide by link pins and second ends coupled to the base member a link pins. Finally, in the conventional front derailleur, the link pins are arranged to extend in a direction parallel to or in a direction orthogonal to the adjustment direction of the base member.

SUMMARY

Generally, the present disclosure is directed to various features of a front derailleur. In general, a travel direction of a chain (chainline) is non-parallel and non-orthogonal to the link pins. In this kind of configuration, the section near the front of the base member will hang over above the chainline. In other words the front derailleur ends up being larger.

In view of the above problem, one aspect of the present invention is to provide a front derailleur which can be more compact.

In accordance with a first aspect of the present invention, a front derailleur is attachable about a crank axle of a bicycle. The front derailleur basically comprises a base member, a chain guide and a link mechanism. The base member is configured to be adjustably mounted on the bicycle in a predetermined adjustment direction. The chain guide is configured to guide a chain. The link mechanism movably couples the chain guide to the base member. The link mechanism includes a first link member pivotally arranged in relation to the base member about a first link axis and pivotally arranged in relation to the chain guide about a second link axis. The first link axis and the second link axis are arranged non-parallel and non-orthogonal to the predetermined adjustment direction when viewed from the axial direction of the crank axis in a state where the base member is mounted to the bicycle.

In this kind of front derailleur, the first link axis and the second link axis are non-parallel and non-orthogonal to the predetermined adjustment direction, and thus the front part of the base member may be made more compact along the chainline. Consequently, this allows the entire front derailleur to be configured more compactly.

The first link axis and the second link axis can be inclined in relation to the predetermined adjustment direction within a range of 30 degrees. In this case, it is possible to configure the first link axis and the second link axis substantially orthogonal to the chainline, and the front derailleur may be more effectively made compact.

The first link axis and the second link axis can be arranged parallel to each other. In this case, the chain guide moves smoothly due to the link member.

The link mechanism can further include includes a second link member pivotally arranged in relation to the base member about a third link axis and pivotally arranged in relation to the chain guide about a fourth link axis. The third link axis and the fourth link axis are non-parallel and non-orthogonal when viewed from the axial direction of the crank axis in a state where the base member is mounted to the bicycle. In this case the base member, the first link member, the second link member, and the chain guide make up a four-bar linkage that better stabilizes and moves the chain guide.

The first link axis, the second link axis, the third link axis, and the fourth link axis can be arranged parallel to each other. In this case, the four-bar linkage stabilizes the chain guide allowing the chain guide to move smoothly.

The front derailleur according to another aspect of the present invention can be mounted on a bicycle having a rear hub axis, a crank axis, and a chain ring for rotating about the crank axis. The front derailleur is provided with a base member, a chain guide and a link mechanism. The base member is configured to be mounted on the bicycle. The chain guide is configured to guide a chain. The link mechanism is configured to movably couple the chain guide to the base member. The link mechanism includes a first link member pivotally arranged in relation to the base member about a first link axis and pivotally arranged in relation to the chain guide about a second link axis. The first link axis and the second link axis are arranged so as to be inclined in relation to a first plane within a range from 80 degrees to 100 degrees in a driving rotation direction of the chain ring in a state where the base member is mounted to the bicycle. The first plane includes the rear hub axis and the crank axis.

In this kind of front derailleur, the first link axis and the second link axis are arranged inclined in relation to the first plane within a range from 80 degrees to 100 degrees in the driving rotation direction of the chain ring where the first plane includes the rear hub axis and the crank axis, and therefore the front part of the base member may be made more compact along the chainline. Consequently, this allows the entire front derailleur to be configured more compactly.

The first link axis and the second link axis can be arranged parallel to each other. In this case, the chain guide can move smoothly due to the link member.

The link mechanism can further include a second link member pivotally arranged in relation to the base member about a third link axis and pivotally arranged in relation to the chain guide about a fourth link axis. The third link axis and the fourth link axis are arranged so as to be inclined in relation to a first plane within a range from 80 degrees to 100 degrees in the driving rotation direction of the chain ring in a state where the base member is mounted to the bicycle. In this case the base member, the first link member, the second link member, and the chain guide make up a four-bar linkage that better stabilizes and moves the chain guide.

The first link axis, the second link axis, the third link axis, and the fourth link axis can be arranged parallel to each other. In this case, the four-bar linkage stabilizes the chain guide allowing the chain guide to move smoothly.

The link mechanism can be configured such that an operation cable is attachable to the link mechanism, and the base member can have a cable guiding structure for guiding the operation cable frontward. In this case the operation cable actuates the link member.

The cable guiding structure can be configured such that the operation cable extends from a second plane which is orthogonal to the first plane to within a range of 150 degrees in the driving direction of the chain ring. In this case, the direction in which the operation cable extends intersects with the first link axis and the second link axis, and thereby allows the operation cable to effectively actuate the first link member.

Also other objects, features, aspects and advantages of the disclosed front derailleur will become apparent to those skilled in the art from the following detailed description, which, taken in conjunction with the annexed drawings, discloses one embodiment of the front derailleur.

BRIEF DESCRIPTION OF THE DRAWINGS

Referring now to the attached drawings which form a part of this original disclosure.

DETAILED DESCRIPTION OF EMBODIMENTS

Figure 1:
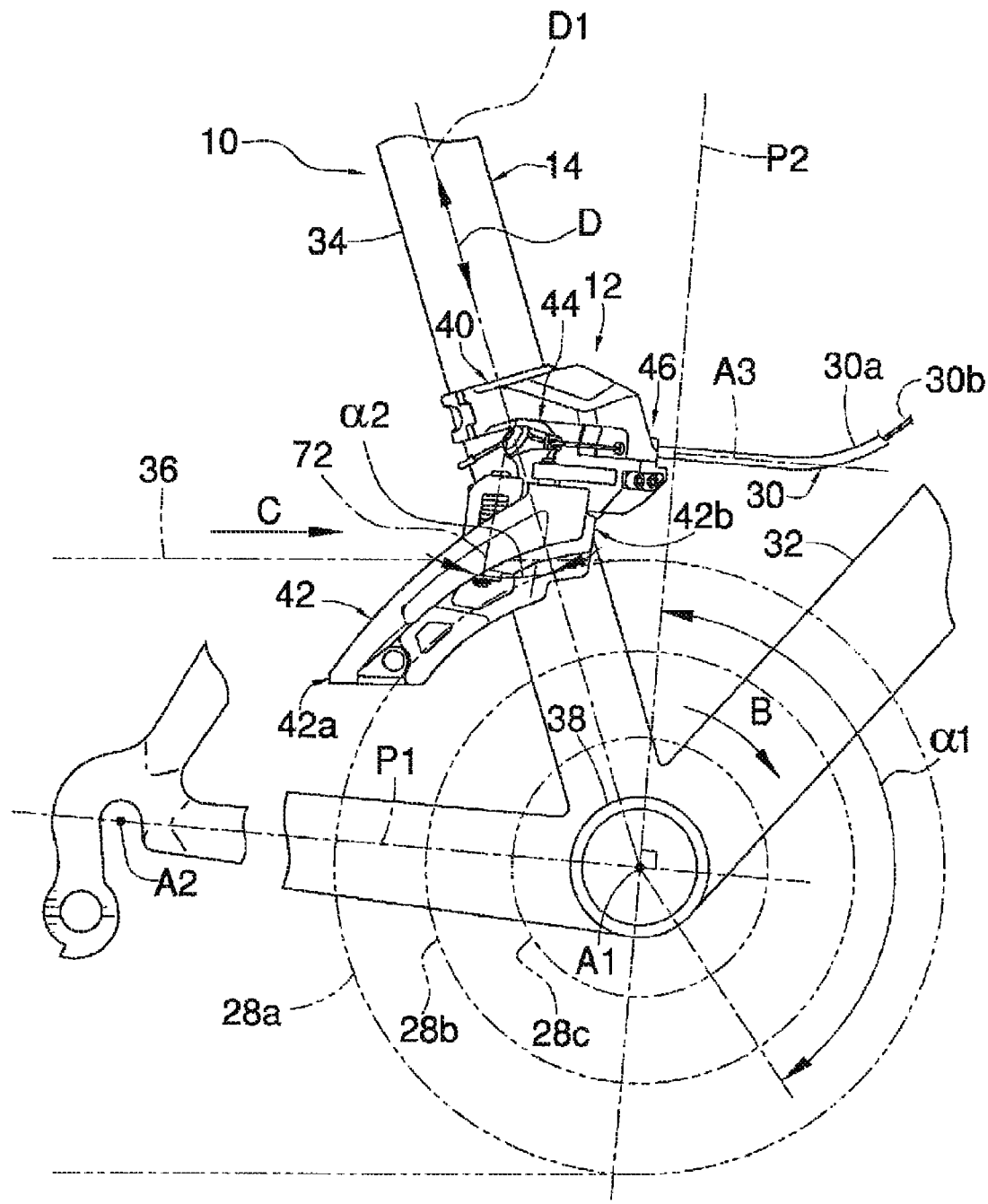
FIG. 1 is a right side elevational view of a bicycle that is equipped with a front derailleur in accordance with one illustrated embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. Referring initially to FIG. 1, a bicycle 10 is illustrated that is equipped with a front derailleur 12 in accordance with a first embodiment. The crank axis A1 and the rear hub axis A2 are arranged parallel to each other. The front derailleur 12 is detachably mounted on the seat tube 34 of the frame 14 in a detachable and reinstallable manner. A shift operation is conducted to the front derailleur 12 by an operation device which is mounted on a handlebar of the bicycle 10 through an operation cable 30 (the operation device and the handlebar are not illustrated in the drawing). The operation cable 30 includes an outer casing 30a and an inner cable 30b which can pass through the outer casing 30a. The operation cable 30 is a conventional Bowden cable. The inner cable 30b is slidable inside the outer casing 30a. For example, the operation cable 30 is arranged inside a down tube 32 of the frame 14. The operation cable 30 is then taken from inside the down tube 32 in the middle and coupled to the front derailleur 12. Here, the words "front", "rear", "left", "right", "up", and "down", and synonymous words thereof refer to "front", "rear", "left", "right", "up", and "down" as seen from a rider who is seated on a saddle and faces a handlebar (either is not illustrated in the drawing).

The front derailleur 12 is mounted on the seat tube 34 in the illustrated embodiment. However, the front derailleur 12 can be mounted on a suitable location other than the seat tube such as a hanger tube (bottom bracket tube) 38 or the like. The crank axis A1 is defined by the hanger tube 38. More specifically, the crank axis A1 corresponds to a center longitudinal axis of the hanger tube 38. Thus, the crank axis A1 is the center of rotation of a plurality of (here, three) chain rings 28a, 28b, and 28c. The rear hub axis A2 is defined by a center axis of a rear hub (rear wheel) which is not illustrated in the drawing. Thus, the rear hub axis A2 is the center of rotation of the rear hub.

The front derailleur 12 is configured such that the operation cable 30 exits forwardly from the front derailleur 12 along a cable axis A3. The cable axis A3 extends in the range of an angle α1 in a driving rotation direction (illustrated in FIG. 1 by arrow B) of the chain rings 28a, 28b, and 28c forwardly from a second plane P2 that is perpendicular to a first plane P1 including the rear hub axis A2 and the crank axis A1. Here, the angle α1 is 150 degrees. The "driving rotation direction" refers to a rotation direction of the chain rings 28a, 28b, and 28c for driving a chain 36 in an arrow C direction, as described below. In other words, the "driving rotation direction" refers to a rotation direction of the chain rings 28a, 28b, and 28c for moving the bicycle 10 forward.

Figure 2:
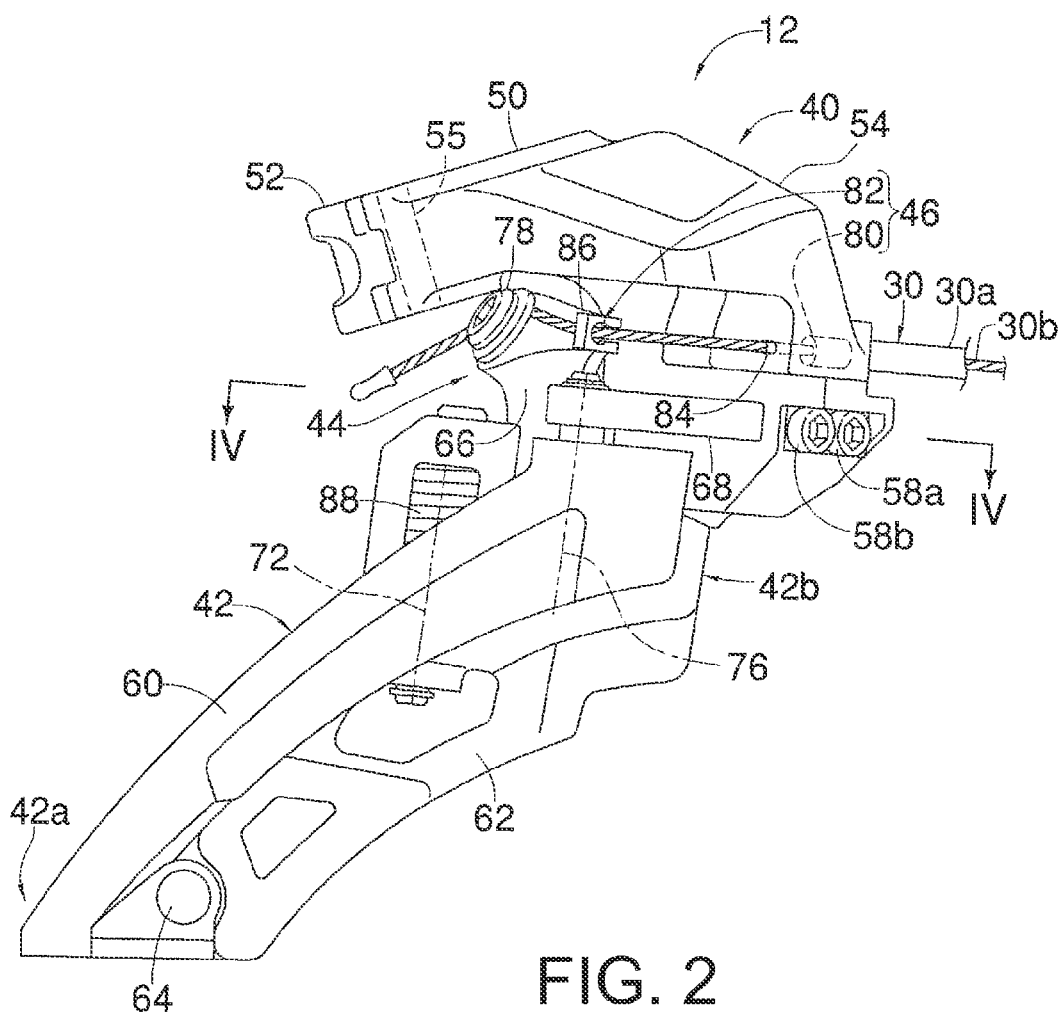
FIG. 2 is an enlarged right side elevational view of the front derailleur in accordance with the illustrated embodiment.

As shown in FIG. 2, the front derailleur 12 includes a base member 40, a chain guide 42, a link mechanism 44 and a cable guiding structure 46. The base member 40 is configured to be detachably fixed to the bicycle 10 in a detachable and reinstallable manner. The chain guide 42 is configured to guide the chain 36. The link mechanism 44 movably couples the chain guide 42 to the base member 40. In particular, the link mechanism 44 movably couples the chain guide 42 to the base member 40 among a retracted position close to the frame 14, an extended position away from the frame 14 compared to the retracted position, and an intermediate position located between the retracted position and the extended position in response to movement of the inner cable 30b, for example. More specifically, the chain guide 42 is moved relative to the base member 40 in a direction away from the frame 14 by pulling the inner cable 30b. The chain guide 42 is moved relative to the base member 40 in a direction close to the frame 14 by releasing the inner cable 30b. In this way, the chain guide 42 guides the chain 36 to any one of the chain rings 28a, 28b, and 28c in response to the operation of the operation device which is not illustrated in the drawing.

Figure 3:
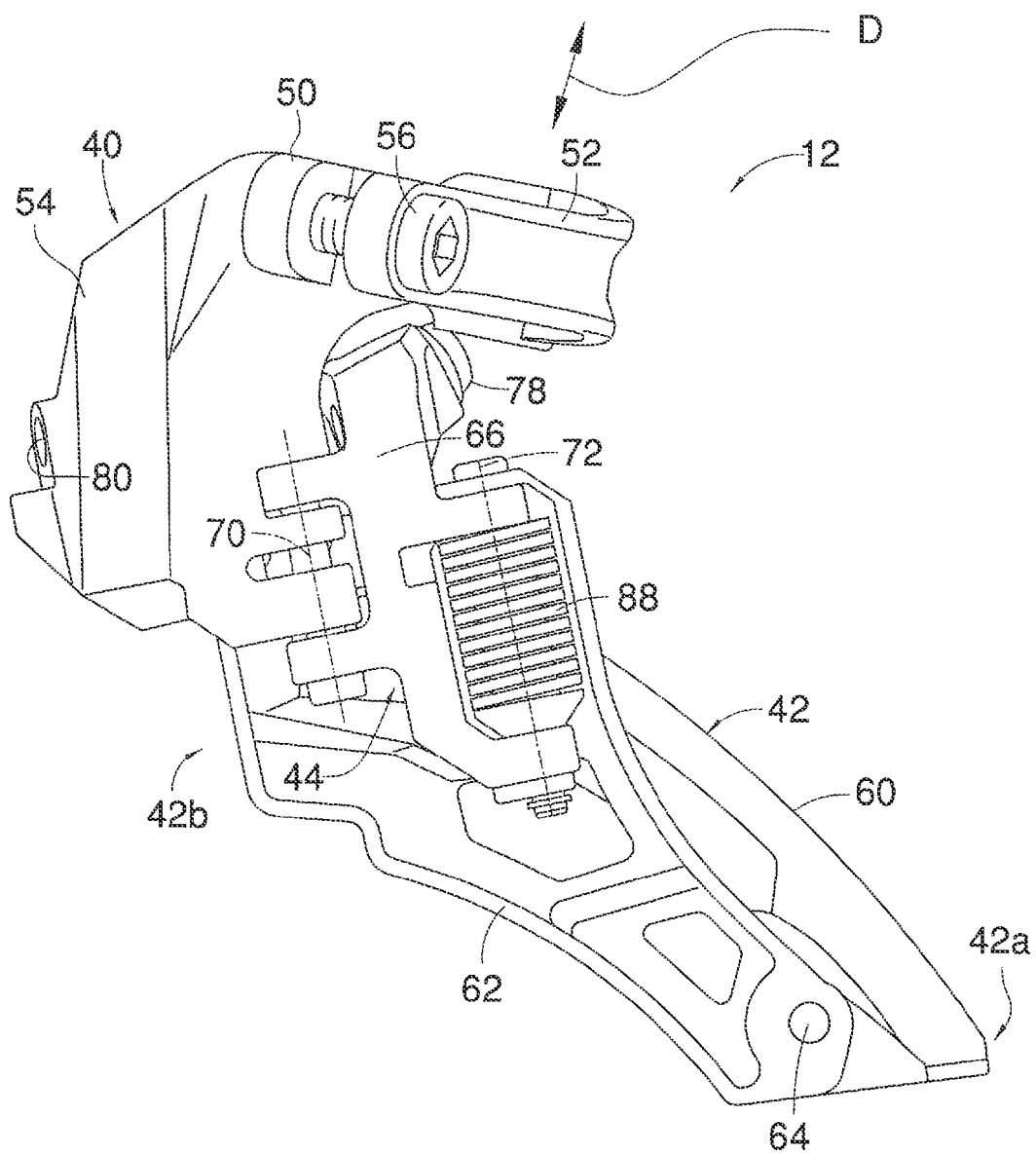
FIG. 3 is an enlarged left side view of the front derailleur in accordance with the embodiment of the present invention.

The base member 40 is attached to the seat tube 34 above the chain guide 42 such that the position of the base member 40 can be adjusted. The position of the base member 40 can be adjusted in a predetermined adjustment direction D along a center axis D1 of the seat tube 34 as illustrated in FIG. 1. As illustrated in FIGS. 2 and 3, in this embodiment, the base member 40 is configured as a band clamp that sandwiches the seat tube 34.

As further illustrated in FIGS. 2 and 3, the base member 40 has a first clamp part 50, a second clamp part 52 and a linkage part 54. A hinge pin 55 couples a first end part of the first clamp part 50 and a first end part of the second clamp part 52 to pivot in relation to one another. A second end part of the first clamp part 50 and a second end part of the second clamp part 52 are fastened together by a fastening member 56 constituted by a bolt, and the like. The fastening member 56 has a shaft portion that forms the screw thread. The shaft portion of the fastening member 56 is inserted through a through-hole in the second clamp 52 and screws into the screw hole provided in the first clamp 50. The second end parts of the first and second clamp parts 50 and 52 are hereby brought together so that the first and second clamp parts 50 and 52 sandwich the seat tube 34. In this way, the base member 40 is thus secured to the seat tube 34. The linkage part 54 is provided to extend from the first clamp part 50 to the right, and then to extend downward. The lower-front end part of the linkage part 54 is provided with a low-position adjustment screw 58a, and a top-position adjustment screw 58b. The low-position adjustment screw 58a is provided for adjusting the retracted position of the chain guide 42. The top-position adjustment screw 58b is provided for adjusting the extended position of the chain guide 42.

As shown in FIGS. 2 and 3, the chain guide 42 includes a first guide plate 60 (outside/right side guide plate) and a second guide plate 62 (inside/left side guide plate). A chain slot S is formed between the first guide plate 60 and the second guide plate 62 through which the chain 36 passes. The first guide plate 60 and the second guide plate 62 are arranged to face each other in a lateral direction (horizontal direction). As described above, the chain guide 42 is movably coupled to the base member 40 by the link mechanism 44 between the retracted position and the extended position. The chain guide 42 has an upstream end 42a and a downstream end 42b. The terms "upstream" and "downstream" as used herein mean with respect to the movement direction of the chain 36 during pedaling. For example, in FIG. 1, the chain 36 moves in the arrow C direction during pedaling. Therefore, the left side in FIG. 1 is upstream and the right side in FIG. 1 is downstream. The first guide plate 60 is bent at the upstream end 42a to extend toward the second guide plate 62. The first guide plate 60 is coupled to the second guide plate 62 by a rivet 64. Also, the first guide plate 60 and the second guide plate 62 are integrally coupled to each other at the downstream end 42b by a coupling portion which extends in the lateral direction (horizontal direction). The first guide plate 60 contacts an outer surface of the chain 36 and moves in a leftward lateral direction toward the frame 14 such that the chain 36 is moved toward the retracted position. The second guide plate 62 contacts an inner surface of the chain 36 and moves in a rightward lateral direction away from the frame 14 such that the chain 36 is moved toward the extended position.

Figure 4:
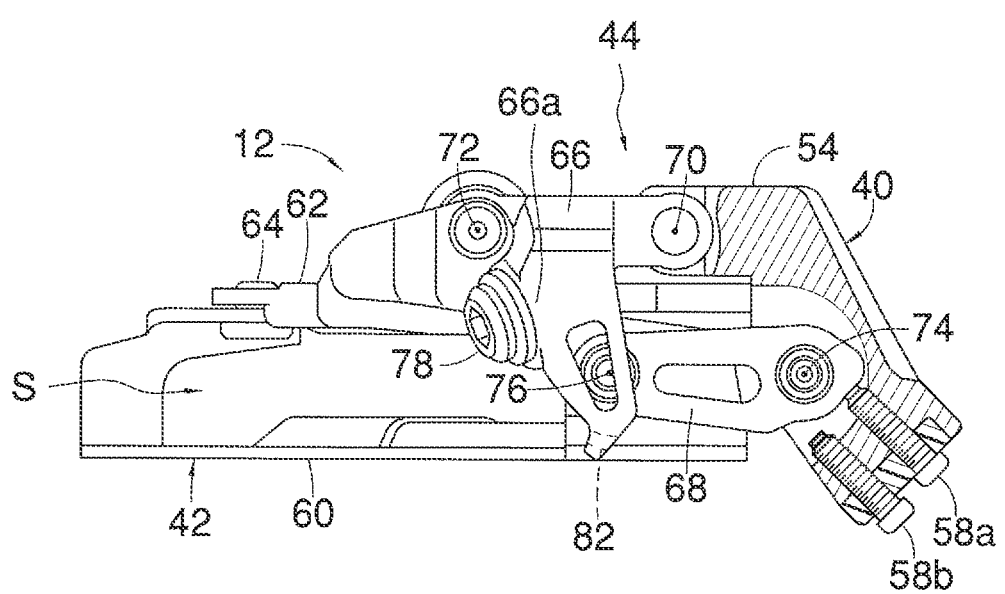
FIG. 4 is a cross-sectional view of the front derailleur as seen along section line IV-IV of FIG. 2.

As shown in FIG. 4, the link mechanism 44 includes a first link member 66 and a second link member 68, and is configured as a four-bar link mechanism together with the base member 40 and the chain guide 42. The first link member 66 pivots around a first link axis 70 with respect to the base member 40 and pivots around a second link axis 72 with respect to the chain guide 42. The first link axis 70 and the second link axis 72 are arranged parallel to each other. The second link member 68 pivots around a third link axis 74 with respect to the base member 40 and pivots around a fourth link axis 76 with respect to the chain guide 42. The third link axis 74 and the fourth link axis 76 are arranged parallel to each other. Further, the first link axis 70, the second link axis 72, the third link axis 74, and the fourth link axis 76 are arranged parallel to each other. The first link axis 70, the second link axis 72, the third link axis 74, and the fourth link axis 76 are substantially vertically arranged in a state in which the front derailleur 12 is attached to the bicycle 10. Further, the first link member 66 is arranged in a position closer to the frame 14 compared to the second link member 68 (arranged on the left side) in a state in which the front derailleur 12 is attached to the bicycle 10.

The first link member 66 includes a cable mounting part 66a. The inner cable 30b is sandwiched by the cable mounting part 66a and a head of a bolt 78 screwed into the cable mounting part 66a, and the inner cable 30b is fixed to the first link member 66. The cable guiding structure 46 is configured to guide the operation cable 30 from the cable mounting part 66a toward a front side of the bicycle 10 with respect to the downstream end 42b of the chain guide 42. The cable guiding structure 46 is disposed in at least one of the base member 40 and the link mechanism 44, as explained below. In either case, preferably, the operation cable 30 is guided to a location further forward as compared to a conventional cable guiding structure in which the operation cable 30 is guided upwardly or downwardly along the seat tube 34.

The cable guiding structure 46 includes a first cable guiding part 80 which is formed on the base member 40 and a second cable guiding part 82 formed on the link mechanism 44. The first cable guiding part 80 is provided as a through-hole in the linkage part 54 of the base member 40, while the second cable guiding part 82 is provided as a through-hole on the first link member 66. An insert sleeve 84 is mounted in the first cable guiding part 80 for improving the sliding performance of the inner cable 30b. Finally, the first link member 66 includes a protruding section 86 that extends to the right side, and the second cable guiding part 82 is provided in the protruding section 86.

The link mechanism 44 is further includes a biasing member 88. The biasing member 88 biases the chain guide 42 in one of a retracted position direction and an extended position direction. In the illustrated embodiment, the biasing member 88 is a torsion coil spring which biases the chain guide 42 in the retracted position direction. The biasing member 88 is coaxially arranged with the second link axis 72.

The first link axis 70, the second link axis 72, the third link axis 74 and the fourth link axis 76 are each arranged non-parallel with and non-orthogonal in relation to the predetermined adjustment direction D when viewed from the axial direction of the crank axis A1 usage state, where the base member 40 is mounted to the frame 14. In this embodiment, the first link axis 70, the second link axis 72, the third link axis 74, and the fourth link axis 76 (only the second link axis 72 is illustrated in FIG. 1) are respectively provided so as to fall within an angle α2 of 30 degrees of the predetermined adjustment direction D when viewed from the axial direction of the crank axis A1. That is, more specifically, the first link axis 70, the second link axis 72, the third link axis 74 and the fourth link axis 76 are respectively provided so as to fall from 20 degrees to 25 degrees. Moreover, "usage state" corresponds to a state where the front derailleur 12 is appropriately mounted to the bicycle 10 for use in shifting gears.

For a front derailleur 12 configured in this manner, when the inner cable of the operation cable 30 pulls on the front derailleur 12, as previously described the chain guide 42 moves in a direction away from the frame 14, and the chain guide 42 moves relative to the base member 40 towards the large-diameter chain ring. At this time, the shape of the front portion of the base member 40 may be configured to be more compact along the track of the chain 36 (chainline) represented by the dotted line in FIG. 1 due to the above described arrangement of the first link axis 70, the second link axis 72, the third link axis 74 and the fourth link axis 76. Consequently, this allows the entire front derailleur 12 to be configured more compactly.

Figure 5:
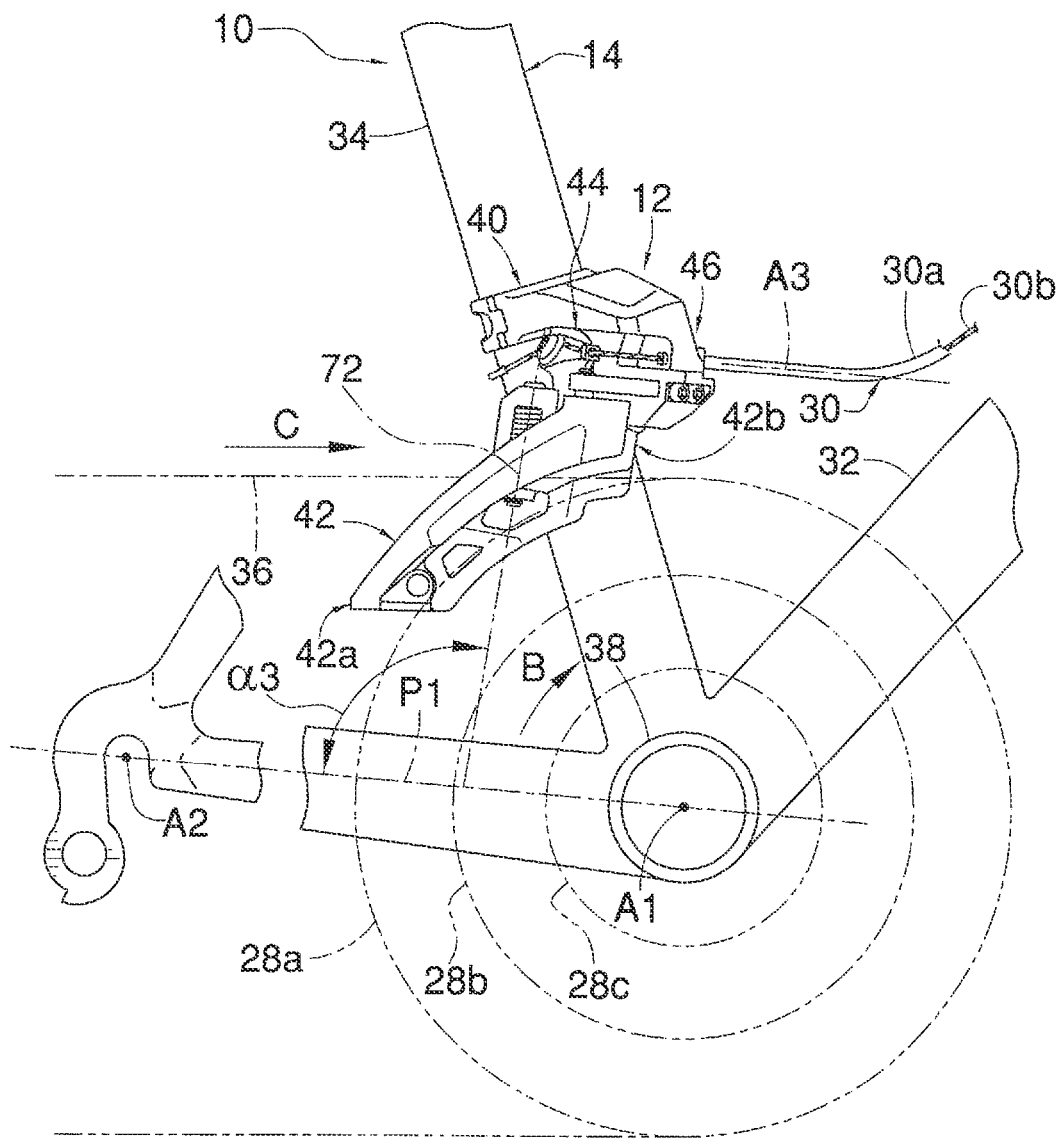
FIG. 5 is a right side elevational view of the bicycle that is equipped with the front derailleur for explaining the relationship between a link axis and a first plane.

Furthermore, as illustrated in FIG. 5, the first link axis 70 and the second link axis 72 are arranged at an angle α3 from 80 degrees to 100 degrees in relation to the first plane P1 usage state, where the base member 40 is mounted to the bicycle 10. That is, the first link axis and the second link axis are arranged inclined in relation to the first plane within a range from 80 degrees to 100 degrees in the driving rotation direction B of the chain rings 28a, 28b, 28c where the first plane includes the rear hub axis A2 and the crank axis A1. The range of the angle α3 may be more preferably set from 85 degrees to 95 degrees. The third link axis 74 and the fourth link axis 76 are configured in the same manner.

The shape of the front portion of the base member 40 may be configured to be more compact along the track of the chain 36 (chainline) represented by the dotted line in FIG. 5 with this configuration as well. Consequently, this allows the entire front derailleur 12 to be configured more compactly.

OTHER EMBODIMENTS

While an embodiment of the present invention is explained in the above, the present invention is not limited to the above embodiment, and various modifications can be made herein without departing from the scope of the present invention. In particular, a plurality of embodiments and modified examples described in the present specification can be optionally combined as needed.

(a) In the above-mentioned embodiment, the link axes are arranged to extend substantially vertically when the front derailleur is mounted to the bicycle; however, the link axes may be arranged to extend substantially horizontally when the front derailleur is mounted to the bicycle.

(b) In the above-mentioned embodiment, the chain guide 42 may move to one of three positions; however, the chain guide 42 may be configured to move to two positions, the retracted position and the extended position.

(c) In the above-mentioned embodiment, the base member 40 is a band clamp; however, the present invention is not limited to this configuration. The base member may be fixedly secured to the seat tube and the like by being screwed into a hole provided on the frame; furthermore, the base member may be secured to the bottom bracket.

(d) In the above-mentioned embodiment is described a front derailleur that is actuated using an operation cable; however, the present invention is not limited to this configuration. An electrically-driven front derailleur may also be adopted in the present invention.

(e) The first link axis and the second link axis need not have the same angle of incline. Moreover, the third link axis, and the fourth link axis need not have the same angle of incline. More specifically, for a four-bar linkage, the first link axis and the third link axis may have the same angle of incline, while the second link axis and the fourth link axis have the same angle of incline.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A front derailleur for mounting to a bicycle having a crank axis, the front derailleur comprising:
   a base member configured to be adjustably mounted on the bicycle in a predetermined adjustment direction extending along a center axis of a seat tube of the bicycle;
   a chain guide configured to guide a chain; and
   a link mechanism movably coupling the chain guide to the base member, the link mechanism including a first link member pivotally arranged in relation to the base member about a first link axis and pivotally arranged in relation to the chain guide about a second link axis;
   the first link axis and the second link axis 1 ring in planes that are non-parallel and nonorthogonal with respect to the predetermined adjustment direction when viewed from the axial direction of the crank axis in a state where the base member is mounted to the bicycle and the crank axis is parallel to the planes.

2. The front derailleur according to claim 1, wherein the first link axis and the second link axis are inclined in relation to the predetermined adjustment direction within a range of 30 degrees.

3. The front derailleur according to claim 1, wherein the first link axis and the second link axis are arranged parallel to each other.

4. The front derailleur according to claim 1, wherein the link mechanism further includes a second link member pivotally arranged in relation to the base member about a third link axis and pivotally arranged in relation to the chain guide about a fourth link axis; and
   the third link axis and the fourth link axis are non-parallel and non-orthogonal to the predetermined direction when viewed from the axial direction of the crank axis in a state where the base member is mounted to the bicycle.

5. The front derailleur according to claim 4, wherein the first link axis, the second link axis, the third link axis, and the fourth link axis are arranged parallel to each other.

6. The front derailleur according to claim 2, wherein the first link axis and the second link axis are arranged parallel to each other.

7. The front derailleur according to claim 2, wherein the link mechanism further includes a second link member pivotally arranged in relation to the base member about a third link axis and pivotally arranged in relation to the chain guide about a fourth link axis; and
   the third link axis and the fourth link axis are non-parallel and non-orthogonal when viewed from the axial direction of the crank axis in a state where the base member is mounted to the bicycle.

8. The front derailleur according to claim 7, wherein the first link axis, the second link axis, the third link axis, and the fourth link axis are arranged parallel to each other.

9. A front derailleur for mounting to a bicycle a rear hub axis, a crank axis, and a chain ring for rotating about the crank axis, the front derailleur comprising:
   a base member configured to be mounted on the bicycle;
   a chain guide configured to guide a chain; and
   a link mechanism configured to movably couple the chain guide to the base member, the link mechanism including a first link member pivotally arranged in relation to the base member about a first link axis and pivotally arranged in relation to the chain guide about a second link axis;

the first link axis and the second link axis being arranged so as to be inclined in relation to a first plane within a range from 80 degrees to 100 degrees in a driving rotation direction of the chain ring in a state where the base member is mounted to the bicycle, the first plane including the rear hub axis and the crank axis.

10. The front derailleur according to claim 9, wherein the first link axis and the second link axis are arranged parallel to each other.

11. The front derailleur according to claim 9, wherein the link mechanism further includes a second link member pivotally arranged in relation to the base member about a third link axis and pivotally arranged in relation to the chain guide about a fourth link axis; and the third link axis and the fourth link axis are arranged so as to be inclined in relation to the first plane within a range from 80 degrees to 100 degrees in the driving rotation direction of the chain ring in a state where the base member is mounted to the bicycle.

12. The front derailleur according to claim 10, wherein the first link axis, the second link axis, the third link axis, and the fourth link axis are arranged parallel to each other.

13. The front derailleur according to claim 9, wherein the link mechanism is configured such that an operation cable is attachable to the link mechanism; and the base member includes a cable guiding structure for guiding the operation cable frontward.

14. The front derailleur according to claim 13, wherein the cable guiding structure is configured such that the operation cable extends from a second plane which is orthogonal to the first plane to within a range of 150 degrees in the driving direction of the chain ring.

15. The front derailleur according to claim 10, wherein the link mechanism is configured such that an operation cable is attachable to the link mechanism; and the base member includes a cable guiding structure for guiding the operation cable frontward.

16. The front derailleur according to claim 15, wherein the cable guiding structure is configured such that the operation cable extends from a second plane which is orthogonal to the first plane to within a range of 150 degrees in the driving direction of the chain ring.

17. The front derailleur according to claim 11, wherein the link mechanism is configured such that an operation cable is attachable to the link mechanism; and the base member includes a cable guiding structure for guiding the operation cable frontward.

18. The front derailleur according to claim 17, wherein the cable guiding structure is configured such that the operation cable extends from a second plane which is orthogonal to the first plane to within a range of 150 degrees in the driving direction of the chain ring.

* * * * *